United States Patent
Suk

(10) Patent No.: US 10,423,225 B2
(45) Date of Patent: Sep. 24, 2019

(54) DISPLAY APPARATUS, AND INPUT PROCESSING METHOD AND SYSTEM USING SAME

(71) Applicant: VISUALCAMP CO., LTD., Daejeon (KR)

(72) Inventor: Yoon Chan Suk, Seoul (KR)

(73) Assignee: VISUALCAMP CO., LTD., Daejeon (KR)

( * ) Notice: Subject to any disclaimer, the term of this patent is extended or adjusted under 35 U.S.C. 154(b) by 0 days.

(21) Appl. No.: 16/166,450

(22) Filed: Oct. 22, 2018

(65) Prior Publication Data
US 2019/0056785 A1  Feb. 21, 2019

Related U.S. Application Data

(63) Continuation of application No. PCT/KR2017/004291, filed on Apr. 21, 2017.

(30) Foreign Application Priority Data

Apr. 21, 2016 (KR) .................. 10-2016-0048842
Apr. 21, 2017 (KR) .................. 10-2017-0051512

(51) Int. Cl.
*G06F 3/01* (2006.01)
*G06F 3/16* (2006.01)
(Continued)

(52) U.S. Cl.
CPC .............. *G06F 3/013* (2013.01); *G06F 3/017* (2013.01); *G06F 3/04842* (2013.01);
(Continued)

(58) Field of Classification Search
CPC ........ G06F 3/013; G06F 16/951; G06F 3/017; G06F 3/04842; G06F 3/167
See application file for complete search history.

(56) References Cited

U.S. PATENT DOCUMENTS 9,152,222 B2   10/2015  Denker et al.
2013/0311508 A1  11/2013  Denker et al.
(Continued)

FOREIGN PATENT DOCUMENTS

KR   10-2008-0051664 A   6/2008
KR   10-2012-0116134 A   10/2012
(Continued)

OTHER PUBLICATIONS

International Search Report for PCT/KR2017/004291 dated Aug. 3, 2017.
(Continued)

*Primary Examiner* — Ibrahim A Khan
(74) *Attorney, Agent, or Firm* — The PL Law Group, PLLC

(57) ABSTRACT

An input processing system according to one embodiment includes an eye-tracking apparatus configured to generate eye-tracking data by tracking a gaze of a user and transmit the generated eye-tracking data, a voice input apparatus configured to generate a voice input signal by receiving audio from the user and transmit the generated voice input signal, and a display apparatus configured to detect, on a screen, a target associated with input control on the basis of the eye-tracking data, extract a user control command by analyzing the voice input signal, and perform input control for the target associated with input control according to the user control command.

13 Claims, 6 Drawing Sheets

(51) Int. Cl.
*G06F 3/0484* (2013.01)
*G06F 16/951* (2019.01)
*G06F 16/435* (2019.01)

(52) U.S. Cl.
CPC ............ *G06F 3/167* (2013.01); *G06F 16/436* (2019.01); *G06F 16/951* (2019.01)

(56) References Cited

U.S. PATENT DOCUMENTS

| | | | | |
|---|---|---|---|---|
| 2014/0365228 | A1* | 12/2014 | Ng-Thow-Hing | G02B 27/01 704/275 |
| 2015/0338915 | A1* | 11/2015 | Publicover | G06K 9/0061 345/633 |
| 2015/0356971 | A1 | 12/2015 | Stolcke et al. | |
| 2016/0109947 | A1* | 4/2016 | George-Svahn | G06F 3/165 345/156 |
| 2017/0052595 | A1* | 2/2017 | Poulos | G02B 27/0103 |
| 2017/0090566 | A1* | 3/2017 | George-Svahn | G02B 27/01 |
| 2017/0123492 | A1* | 5/2017 | Marggraff | G06F 3/0236 |

FOREIGN PATENT DOCUMENTS

| | | |
|---|---|---|
| KR | 10-2014-0051771 A | 5/2014 |
| KR | 10-2014-0117469 A | 10/2014 |
| KR | 10-2014-0132246 A | 11/2014 |
| KR | 10-2015-0032054 A | 3/2015 |

OTHER PUBLICATIONS

Office action dated Jan. 30, 2018 from Korean Intellectual Property Office in a counterpart Korean Patent Application No. 10-2017-0051512 and the translation thereof (all the cited references are listed in this IDS.).

* cited by examiner ial Application No. PCT/KR2017/004291 with an International Filing Date of Apr. 21, 2017, which claims the benefit of Korean Patent Application No. 10-2016-0048842, filed on Apr. 21, 2016 and Korean Patent Application No. 10-2017-0051512, filed on Apr. 21, 2017, at the Korean Intellectual Property Office, the disclosures of which are incorporated by reference herein in their entirety.

BACKGROUND

1. Field

The following description relates to a technology for displaying an input signal, and more particularly, to a display apparatus and an input processing method and system using the same.

2. Description of Related Art

In recent years, the range of devices to which the eye-tracking technology is applied is widening, and the technology for accurate eye-gaze detection is being continuously developed. In particular, a technology for using an eye-tracking technique as an input device for receiving information from a user without an additional input tool in a virtual reality or augmented reality has been emerged.

However, when the information is received from the user using only eye tracking, the user's intention may not be accurately identified so that input may not be performed as desired by the user. Moreover, when only eye tracking is used, it is difficult to perform functions, such as pause, display of various menus, and the like, on a screen of a current display.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The disclosed embodiments are intended to provide a new input interface scheme based on eye-tracking data.

In one general aspect, there is provided an input processing system including: an eye-tracking apparatus configured to generate eye-tracking data by tracking a gaze of a user and transmit the generated eye-tracking data; a user input apparatus configured to generate a user input signal according to an input of the user and transmit the generated user input signal; and a display apparatus configured to receive the eye-tracking data and the user input signal, perform input control on the basis of the eye-tracking data and the user input signal, and cancel the performed input control when eye-tracking data is received from the eye-tracking apparatus within a predetermined period of time after the input control is performed and the received eye-tracking data is associated with the input control.

The user input apparatus may include a first user input apparatus configured to generate a voice input signal by receiving audio from the user and transmit the generated voice input signal and the display apparatus detects, on a screen, a target associated with input control on the basis of the eye-tracking data, extract a user control command by analyzing the voice input signal, and perform input control for the detected target associated with input control according to the user control command.

The input processing system may further include a second user input apparatus configured to generate an auxiliary input signal according to an input of the user and transmit the generated auxiliary input signal, wherein the display apparatus activates a function for analyzing the voice input signal according to whether the auxiliary input signal is received.

When an object gazed at by the user on the screen is a word or image on the basis of the eye-tracking data and the user control command is for searching for meaning of the object, the display apparatus may drive an artificial intelligence (AI) engine associated with the display apparatus to perform a search for meaning of the object.

The input processing system may further include a second user input apparatus configured to generate an auxiliary input signal according to an input of the user and transmit the generated auxiliary input signal, wherein when all of the eye-tracking data, the voice input signal, and the auxiliary input signal are received within a predetermined time delay, the display apparatus drives an AI engine associated with the display apparatus according to the user control command.

The user input signal may be generated by recognizing a gesture of the user in the user input apparatus and the display apparatus may perform predetermined input control corresponding to a combination of an eye-gaze processing pattern based on the eye-tracking data and the gesture of the user.

When the user's gaze based on the eye-tracking data is located at a specific position on the screen for a first period of time, the display apparatus may display a marker at a position corresponding to the user's gaze, and in a case in which it is determined, based on the eye-tracking information, that the user's gaze moves, the display apparatus may move the marker on the screen along a direction in which the user's gaze moves, when a voice input signal is not received within a second period of time, which is set to be longer than the first period of time.

The eye-tracking data enabling the input control to be performed may be a direction of gaze movement, and the display apparatus may cancel the performed input control when eye-tracking data including gaze movement in a direction opposite to the direction of gaze movement is received from the eye-tracking apparatus within the predetermined period of time after the input control is performed.

The eye-tracking data enabling the input control to be performed may be a gaze at a specific position on the screen of the display apparatus, and the display apparatus may cancel the performed input control when eye-tracking data indicating re-gazing at the same specific position on the screen is received from the eye-tracking apparatus within the predetermined period of time after the input control is performed.

In another general aspect, there is provided a display apparatus including: one or more processors; a memory; and one or more programs, wherein the one or more programs are stored in the memory and are configured to be executed by the one or more processors and the one or more programs include: a command for receiving eye-tracking data generated by tracking a gaze of a user from an eye-tracking apparatus; a command for receiving a user input signal generated in accordance with an input of the user from a user input apparatus; a command for performing input control on the basis of the eye-tracking data and the user input signal; a command for checking whether eye-tracking data is received from the eye-tracking apparatus within a predetermined period of time after performing the input control; and a command for cancelling the performed input control when the eye-tracking data is received and the received eye-tracking data is associated with the input control.

The user input signal may include a voice input signal generated by receiving audio from the user and the command of the one or more programs for performing the input control may include a command for detecting, on the screen, a target associated with input control on the basis of the eye-tracking data, a command for extracting a user control command by analyzing the voice input signal, and a command for performing input control for the detected target associated with input control according to the user control command.

The user input signal may further include an auxiliary input signal generated in accordance with an input of the user and the one or more programs may further include a command for activating a function for analyzing the voice input signal according to whether the auxiliary input signal is received.

The command of the one or more programs for performing the input control may include a command for checking, based on the eye-tracking data, whether an object being gazed at by the user on the screen is a word or image; and a command for performing a search for meaning of the object by driving an artificial intelligence (AI) engine associated with the display apparatus when the user control command is for searching for meaning of the object.

The user input signal may further include an auxiliary input signal generated in accordance with an input of the user and the command of the one or more programs for performing the input control may include a command for driving an AI engine associated with the display apparatus according to the user control command when all of the eye-tracking data, the voice input signal, and the auxiliary input signal are received within a predetermined time delay.

The user input signal may be generated by recognizing a gesture of the user in the user input apparatus and the command of the one or more programs for performing the input control may be for performing predetermined input control corresponding to a combination of an eye-gaze processing pattern based on the eye-tracking data and the gesture of the user.

The one or more programs may further include a command for displaying a marker at a position corresponding to the user's gaze when the user's gaze based on the eye-tracking data is located at a specific position on the screen for a first period of time and a command for moving the marker on the screen along a direction in which the user's gaze moves, when it is determined that the user's gaze moves on the basis of the eye-tracking data and when a voice input signal is not received within a second period of time, which is set to be longer than the first period of time.

In still another general aspect, there is provided an input processing method which is performed by a computing device including one or more processors and a memory in which one or more programs to be executed by the one or more processors are stored, the input processing method including: receiving eye-tracking data generated by tracking a gaze of a user from an eye-tracking apparatus; receiving a user input signal generated in accordance with an input of the user from a user input apparatus; performing input control on the basis of the eye-tracking data and the user input signal; checking whether eye-tracking data is received from the eye-tracking apparatus within a predetermined period of time after performing the input control; and cancelling the performed input control when the eye-tracking data is received and the received eye-tracking data is associated with the input control.

Other features and aspects will be apparent from the following detailed description, the drawings, and the claims.

Figure 1:
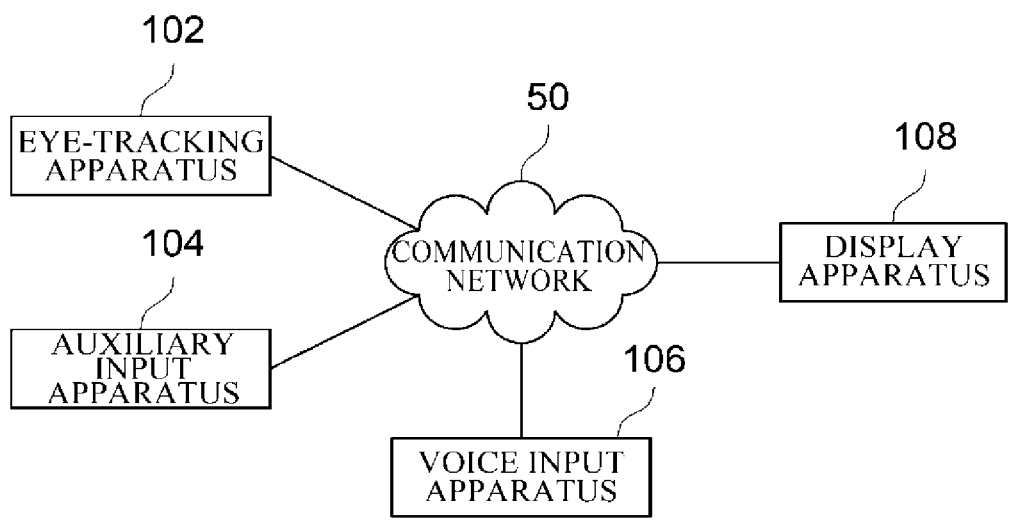
FIG. 1 is a configuration diagram of an input processing system according to one embodiment of the present disclosure.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The present disclosure now will be described more fully hereinafter with reference to FIGS. 1 to 6, in which embodiments of the disclosure are shown. This disclosure may, however, be embodied in many alternate forms and should not be construed as limited to the embodiments set forth herein.

Embodiments of the present disclosure will be described hereinafter with reference to FIGS. 1 to 6.

Descriptions of well-known functions and constructions may be omitted for increased clarity and conciseness. Also, terms described in below are selected by considering functions in the embodiment and meanings may vary depending on, for example, a user or operator's intentions or customs. Therefore, definitions of the terms should be made on the basis of the overall context.

The spirit and scope of the disclosure are defined by the appended claims. The following embodiments are only made to efficiently describe the progressive technological scope of the disclosure to those skilled in the art.

In the following description, terms such as "transfer," "communication," "transmission," and "reception" of a signal or information and other similar terms refer to a signal or information which is directly transmitted from one element to another element and a signal or information which is transmitted from one element to another element via yet another element. Specifically, the transfer or transmission of a signal or information to one element indicates a final destination of the signal or information and does not indicate a direct destination of the signal or information. This is the same in the "reception" of the signal or information. Further, in this specification, the fact that two or more pieces of data or information are related means that when one piece of data (or information) is obtained, at least a part of other data (or information) may be obtained on the basis of the obtained data (or information).

FIG. 1 is a configuration diagram of an input processing system according to one embodiment of the present disclosure.

Referring to FIG. 1, the input processing system 100 according to one embodiment of the present disclosure may include an eye-tracking apparatus 102, an auxiliary input apparatus 104, a voice input apparatus 106, and a display apparatus 108.

The input processing system 100 may be a system for performing predetermined input control on a screen of the display apparatus 108 by combining at least two of eye-tracking data from the eye-tracking apparatus 102, an auxiliary input signal from the auxiliary input apparatus 104, and a voice input signal from the voice input apparatus 106.

In an exemplary embodiment, each of the eye-tracking apparatus 102, the auxiliary input apparatus 104, and the voice input apparatus 106 may be connected to communicate with the display apparatus 108 via a communication network 50, such as a short range wireless network (e.g., Bluetooth, Wi-Fi, or the like). However, the communication network 50 is not limited to the above examples, and the communication network 50 may further include a local area network (LAN), a wide area network (WAN), a cellular network, or the Internet. In addition, each of the eye-tracking apparatus, the auxiliary input apparatus 104, and the voice input apparatus 106 may be connected to communicate with the display apparatus 108 via a wire (e.g., a cable).

The display apparatus 108 displays content on the screen using an image display means. In this case, the image display means may be a means for visually displaying content in various forms, and may include, for example, a liquid crystal display (LCD) panel, an organic light emitting diode (OLED) panel, a plasma display panel (PDP), a transparent display, and the like. In addition, the content may include content in various forms, such as a video, an image, a web page, virtual reality, augmented reality, or the like, which can be visually displayed on the screen using the image display means. In an exemplary embodiment, the display apparatus 108 may be implemented as a virtual reality device, smart glasses, or a head mounted display (HMD) designed to be worn on the head of a user. However, examples of the display apparatus 108 are not limited thereto and the display apparatus 108 may include a smart TV, a smartphone, a personal digital assistant (PDA), a laptop computer, and the like.

The eye-tracking apparatus 102 may track the gaze of the user and transmit eye-tracking data to the display apparatus 108. Here, the eye-tracking data is generated by tracking the gaze of the user and may include, for example, a current gaze position of the user, a direction of user's gaze movement, whether or not the user is gazing at a predetermined direction, and the like.

Specifically, the eye-tracking apparatus 102 may calculate a gaze position of the user by tracking the gaze of the user displayed on the screen of the display apparatus 108 and generate the eye-tracking data on the basis of the gaze position. In an exemplary embodiment, when the display apparatus 108 is in a form that can be worn on the head of the user, the eye-tracking apparatus 102 may be integrally implemented with the display apparatus 108. The eye-tracking apparatus 102 may collect eye motion data of the user using a camera or a sensor in various forms and calculate the user's gaze position using the collected eye motion data.

Techniques for tracking the user's gaze are classified into three methods, including a video analysis method, a contact lens method, and a sensor attachment method. Among these methods, the video analysis method detects movement of the pupil through real-time analysis of camera images captured using a camera and calculates the gaze position based on a fixed position reflected on the cornea. The contact lens method uses light reflected from a contact lens with an embedded mirror or a magnetic field of a contact lens with embedded coils, which is less convenient and more accurate. The sensor attachment method uses an electric field in accordance with the eye movement by placing sensors around eyes and can detect eye movement even when the eyes are closed (e.g., sleeping). However, it should be noted that embodiments of the present disclosure are not limited to a specific eye-tracking method or algorithm.

The user may generate the eye-tracking data through the eye-tracking apparatus 102 by performing gaze processing corresponding to a predetermined eye-gaze processing pattern such that input control, such as display of content control menu, content screen control, or the like, is performed on the display apparatus 108.

The auxiliary input apparatus 104 may generate an auxiliary input signal according to a user's input and transmit the auxiliary input signal to the display apparatus 108. The auxiliary input apparatus 104 may be, but not limited to, a device (e.g., a mouse, a keyboard, or the like) equipped with a mechanical (or a pressure) button that can be pressed by the user, and may be implemented to generate the auxiliary input signal by a user's touch. In an exemplary embodiment, the auxiliary input device 104 may be provided in the form of a wearable device so as to enhance convenience in operation while improving portability for the user. For example, the auxiliary input apparatus 104 may be in the form of a ring-shaped mouse, a mouse that can be held in a hand, a smart watch, or the like.

In addition, the auxiliary input apparatus 104 may be an apparatus capable of sensing a gesture of the user. To this end, the auxiliary input apparatus 104 may include a gesture recognition sensor or a camera. In this case, when the user performs a predetermined gesture, the auxiliary input signal may be generated.

The auxiliary input apparatus 104 may transmit the auxiliary input signal to the display apparatus 108 according to the user's input. In this case, the auxiliary input signal may be a signal for informing the display apparatus 108 that the user's input is generated through the auxiliary input apparatus 104. In an exemplary embodiment, the auxiliary input apparatus 104 is described as an apparatus equipped with a button, and accordingly the auxiliary input signal is described as a signal due to a button input of the user, but is not limited thereto.

Specifically, the auxiliary input apparatus 104 may generate an auxiliary input signal and transmit it to the display apparatus 108 when the button input is generated by the user. As soon as the user presses the button, the auxiliary input apparatus 104 may generate and transmit to the display apparatus 108 the auxiliary input signal indicating that there is a button input and as soon as the button input is released by the user, the auxiliary input apparatus 104 may stop transmitting the auxiliary input signal. The user may press the button of the auxiliary input apparatus 104 at a desired point in time for transmitting the auxiliary input signal so that the input signal can be more accurately transmitted compared with when only the eye-tracking apparatus 102 is used.

The voice input apparatus 106 may receive user's voice and transmit a voice input signal to the display apparatus 108. The voice input apparatus 106 may include a microphone. The voice input apparatus 106 may generate the voice input signal according to vibrations of the user's voice and transmit the generated voice input signal to the display apparatus 108. The voice input apparatus 106 may be integrally implemented with the display apparatus 108.

The user may generate the auxiliary input signal through the auxiliary input apparatus 104 or generate the voice input signal through the voice input apparatus 106 while processing the gaze corresponding to the predetermined eye-gaze processing pattern. Alternatively, the user may generate the auxiliary input signal through the auxiliary input apparatus 104 and also generate the voice input signal through the voice input apparatus 106 while processing the gaze corresponding to the predetermined eye-gaze processing pattern. Accordingly, input control may be performed in the display apparatus 108 according to various combinations of the eye-tracking data, the auxiliary input signal, and the voice input signal.

The display apparatus 108 displays content on the screen using the image display means. The display apparatus 108 may perform predetermined input control according to a combination of at least two of the following factors: the eye-tracking data; the auxiliary input signal; and the voice input signal. Specifically, the input control may be classified according to 1) a combination of the eye-tracking data and the auxiliary input signal, 2) a combination of the eye-tracking data and the voice input signal, and 3) a combination of the eye-tracking data, the auxiliary input signal, and the voice input signal. Meanwhile, in this specification, the auxiliary input signal and the voice input signal may be collectively referred to as a user input signal. That is, the user input signal may include the auxiliary input signal and the voice input signal. In addition, the auxiliary input apparatus 104 and the voice input apparatus 106 may be collectively referred to as a user input apparatus. In other words, the user input apparatus may include the auxiliary input apparatus 104 and the voice input apparatus 106.

Input Control in Accordance with a Combination of Eye-Tracking Data and an Auxiliary Input Signal The display apparatus 108 may control input to the display apparatus 108 on the basis of the eye-tracking data received from the eye-tracking apparatus 102 and the auxiliary input signal received from the auxiliary input device 104.

Specifically, the display apparatus 108 may check an eye-gaze processing pattern of the user through the received eye-tracking data and check whether the eye-gaze processing pattern matches a pre-stored eye-gaze processing pattern. In this case, the eye-gaze processing pattern may refer to a pattern for processing the gaze of the user which includes at least one of a current gaze position of the user, a movement of the gaze from one position to another position (i.e., a direction in which the user's gaze moves), and the user's gaze at a predetermined point (i.e., whether the user is gazing at a predetermined position).

In addition, the display apparatus 108 may check an auxiliary input signal pattern of the user through the received auxiliary input signal and check whether the auxiliary input signal pattern of the user matches a pre-stored auxiliary input signal pattern. For example, the auxiliary input signal pattern may include a duration for which the auxiliary input signal is received (i.e., an auxiliary input duration), the number of times that the auxiliary input signal is input, and the like.

The display apparatus 108 may perform input control corresponding to a combination of the eye-gaze processing pattern and the auxiliary input signal pattern when the eye-gaze processing pattern based on the eye-tracking data matches the pre-stored eye-gaze processing pattern and the auxiliary input signal pattern based on the auxiliary input signal matches the pre-stored auxiliary input signal pattern.

In an exemplary embodiment, the display apparatus 108 may provide only performed content on an entire area of the screen without separately displaying a menu for controlling the content in order to increase user's immersion and concentration on the content. Accordingly, the display apparatus 108 may control the input to the display apparatus 108 by performing input control (e.g., display of a content control menu, screen control for content, and the like) corresponding to the eye-tracking data and the auxiliary input signal, which are received from the eye-tracking apparatus 102 and the auxiliary input apparatus 104, respectively.

That is, when the display apparatus 108 is implemented in a form, such as a virtual reality device, smart glasses, an HMD, and the like, which can be worn on the head of the user, an input for displaying a menu on the screen is difficult and screen control for content is difficult to perform. Thus, the display apparatus 18 may perform input control for displaying a content control menu on the screen or perform screen control for the content through the user's eye-tracking data and the auxiliary input signal.

First Embodiment

Figure 2A:
FIGS. 2A to 2C are block diagrams illustrating an input signal processing apparatus according to one embodiment of the present disclosure.
Figure 2B:
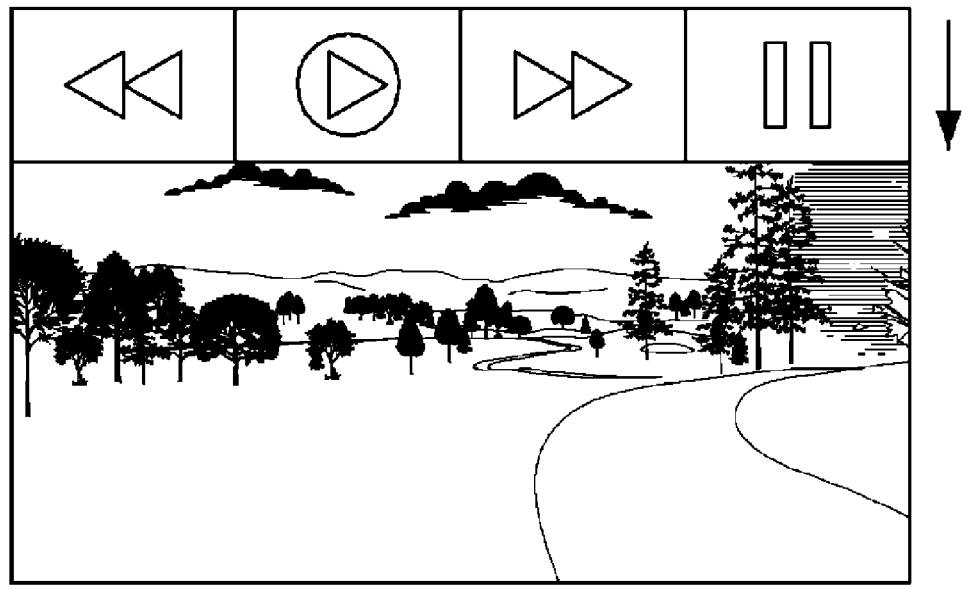
Figure 2C:
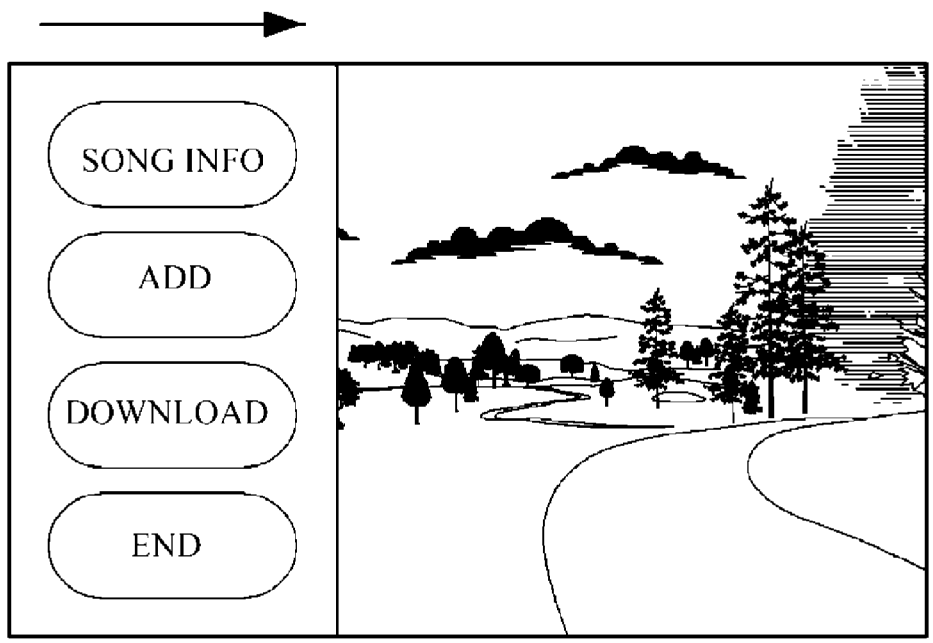

FIGS. 2A to 2C are diagrams illustrating a state of displaying a content control menu on a screen according to a combination of eye-tracking data and an auxiliary input signal in a display apparatus according to one embodiment of the present disclosure. Here, it is assumed that content performed in the display apparatus 108 is a music player.

Referring to FIG. 2A, a control menu of the music player is not displayed on the screen of the display apparatus 108 and a background screen for music is only displayed. Here, the display apparatus 108 may display a content control menu (i.e., a control menu of the music player) on the screen according to an eye-gaze processing pattern and an auxiliary input signal pattern.

Referring to FIG. 2B, when an eye-gaze processing pattern based on eye-tracking data indicates a direction of gaze movement from the top of the screen to the bottom and an auxiliary input signal pattern based on an auxiliary input signal indicates that the number of times of input is 2, the display apparatus 108 may perform predetermined input control (here, the input control is regarded as display of a control menu) corresponding to a combination of the eye-gaze processing pattern and the auxiliary input signal pattern. In other words, the display apparatus 108 may display the control menu of the music player (e.g., a menu for selecting play, pause, next song, previous song, etc.) corresponding to the direction of gaze movement from the top of the screen to the bottom+the twice-input of the auxiliary input signal. In this case, the display apparatus 108 may display the control menu of the music player on the screen, which is scrolled from the top of the screen to the bottom (i.e., in the direction of gaze movement indicated by the eye-gaze processing pattern).

In another example, referring to FIG. 2C, when an eye-gaze processing pattern based on the eye-tracking data indicates a direction of gaze movement from the left of the screen to the right and an auxiliary input signal pattern based on the auxiliary input signal indicates an auxiliary input duration of 2 seconds, the display apparatus 108 may perform predetermined input control (here, the input control is regarded as display of information related menu) corresponding to a combination of the eye-gaze processing pattern and the auxiliary input signal pattern. That is, the display apparatus 108 may display a menu related to the information of the music player (e.g., a menu for selecting information about a song, add, download, end, etc.) corresponding to the direction of gaze movement from the left of the screen to the right+the auxiliary input duration of 2 seconds. In this case, the display apparatus 108 may display the information-related menu on the screen, which is scrolled from the left of the screen to the right (i.e., in the direction of gaze movement indicated by the eye-gaze processing pattern).

Meanwhile, the display apparatus 108 may cancel previously performed input control according to eye-tracking data input within a predetermined period of time after performing the input control. That is, after the display apparatus 108 performs the input control, the display apparatus 108 may cancel previously performed input control when eye-tracking data received from the eye-tracking apparatus 102 within a predetermined period of time is eye-tracking data related to the previously performed input control.

In this case, when the eye-tracking data that enables the input control to be performed is a direction of gaze movement, the eye-tracking data related to the previously performed input control may indicate a movement of the gaze in a direction opposite to said direction of gaze movement. In addition, when the eye-tracking data that enables the input control to be performed indicates gazing at a specific position on the screen, the eye-tracking data related to the previously performed input control may indicate re-gazing at the specific position on the screen. The operation of cancelling the input control may be equally, or similarly, to other input controls (i.e., input control in accordance with a combination of eye-tracking data and an voice input signal, input control in accordance with a combination of eye-tracking data, an auxiliary input signal, and a voice input signal, and the like) in addition to the input control in accordance with a combination of eye-tracking data and an auxiliary input signal.

For example, as shown in FIG. 2B, when an eye-gaze processing pattern in a direction opposite (i.e., a direction of gaze movement from the bottom of the screen to the top) to that of an eye-gaze processing pattern allowing for performing a specific input control is detected within a predetermined period of time (e.g., 2 seconds) after the specific input control to display a control menu of the music player on the screen is performed corresponding to the direction of gaze movement from the top of the screen to the bottom+the twice-input of an auxiliary input signal, the display apparatus 108 may cancel the previously performed specific input control (i.e., display of the control menu on the screen).

Second Embodiment

Figure 3A:
FIGS. 3A to C are diagrams illustrating an example in which a content control menu is displayed on a screen in the process of content input control.
Figure 3B:
Figure 3C:
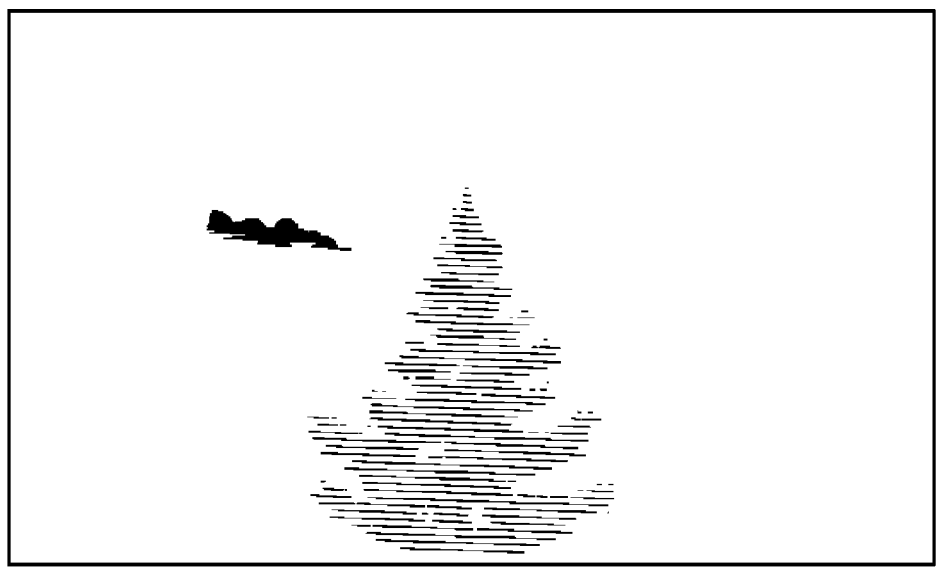

FIGS. 3A to 3C are diagram illustrating a state of performing screen control for content according to a combination of eye-tracking data and an auxiliary input signal in a display apparatus according to one embodiment of the present disclosure. Here, it is assumed that content performed in the display apparatus 108 is a video player.

Referring to FIGS. 3A and 3B, when an eye-gaze processing pattern based on eye-tracking data indicates gazing at a specific position on the screen for 3 seconds or more and an auxiliary input signal pattern based on an auxiliary input signal indicates an auxiliary input duration of 3 seconds, the display apparatus 108 may perform predetermined input control (i.e., content screen control) corresponding to a combination of the eye-gaze processing pattern and the auxiliary input signal pattern.

That is, the display apparatus 108 may determine a position of the user's gaze as a focus area on the basis of the eye-gaze processing pattern (refer to FIG. 3A) and blur the remaining area other than the focus area (refer to FIG. 3B) to perform a content screen control so that the focus area is displayed in a visually distinguishable manner. As such, when eye-tracking data received from the eye-tracking apparatus 102 within a predetermined period of time after the content screen control is performed indicates re-gazing at the focus area, the display apparatus 108 may cancel the previously performed content screen control.

In this case, a way of displaying the focus area in a visually distinguishable manner is not limited to the above example, and various modifications may be included which allow the user to visually distinguish the focus area from the other area by displaying, for example, the color, brightness, or the like of the focus area differently from the other area.

In another example, referring to FIGS. 3A and 3C, when an eye-gaze processing pattern based on eye-tracking data indicates gazing at a specific position for 3 seconds or more and an auxiliary input signal pattern based on an auxiliary input signal indicates an auxiliary input duration of 2 seconds, the display apparatus 108 may perform predetermined input control (i.e., content screen control) corresponding to a combination of the eye-gaze processing pattern and the auxiliary input signal pattern.

That is, the display apparatus 108 may determine a position of the user's gaze as an area to be enlarged on the basis of the eye-gaze processing pattern and perform content screen control so that the pertinent area is enlarged and displayed on the screen (refer to FIG. 3C).

Meanwhile, the display apparatus 108 may perform various other input controls according to a combination of the eye-tracking data and the auxiliary input signal. For example, when the eye-gaze processing pattern based on the eye-tracking data indicates a direction of user's gaze movement and the auxiliary input signal pattern based on the auxiliary input signal indicates an auxiliary input duration, the display apparatus 108 may perform input control so that the screen is moved in the direction of movement of the user's gaze for the auxiliary input duration. In addition, in a case in which the control menu of the music player is displayed as shown in FIG. 2B, when the user gazes at a skip menu in the control menu and an auxiliary input signal is input once, the display apparatus 108 may perform input control for executing the corresponding menu.

Here, the example in which the auxiliary input apparatus 104 is an apparatus equipped with a button is described, but the auxiliary input apparatus 104 is not limited thereto and may be an apparatus for recognizing a user's gesture. In this case, the display apparatus 108 may perform input control on the basis of a combination of an eye-gaze processing pattern based on the user's eye-tracking data and a gesture of the user based on an auxiliary input signal. For example, a menu associated with content is scrolled and displayed along the direction of movement of the user's gaze and when the user performs a gesture of touching a thumb and an index finger, input control, such as stopping the scrolled menu, may be performed.

Input Control in Accordance with a Combination of Eye-Tracking Data and a Voice Input Signal The display apparatus 108 may control input to the display apparatus 108 on the basis of eye-tracking data received from the eye-tracking apparatus 102 and a voice input signal received from the voice input apparatus 106.

Specifically, the display apparatus 108 may detect a target associated with input control from the screen of the display apparatus 108 on the basis of the eye-tracking data received from the eye-tracking apparatus 102. Here, the target associated with input control may be content (e.g., a video, an image, a web page, virtual reality, augmented reality, etc.) which is controlled by the display apparatus 108. In addition, the target associated with input control may be an object (e.g., a menu, a button, or the like on the screen) which is clicked and executed in the display apparatus 108. Further, the target associated with input control may be an object (e.g., a word, an image, or the like) that is searched so that the meaning thereof is described in the display apparatus 108.

Also, the display apparatus 108 may perform input control for the detected target associated with input control on the basis of the voice input signal received from the voice input apparatus 106. That is, the display apparatus 108 may extract a user control command by analyzing the received voice input signal and perform input control for the detected target associated with input control according to the extracted user control command.

For example, when the user's eye-gaze processing pattern based on eye-tracking data indicates gazing at a specific word on the screen and a voice input signal is "what does this word mean?", the display apparatus 108 may search for the meaning of the specific word at which the user is gazing and display the found meaning on the screen or output the meaning by voice through a speaker. In this case, the display apparatus 108 may analyze the voice input signal to extract that the user control command is a search of the meaning of the word.

However, the embodiment is not limited thereto, and a user's gesture, rather than the voice input signal, may be received as an auxiliary input signal. For example, the user's eye-gaze processing pattern based on the eye-tracking data indicates gazing at a specific word on the screen and a user's gesture based on the auxiliary input signal is a gesture of touching the user's thumb and index finger, the display apparatus 108 may search for the meaning of the specific word gazed at by the user and display the meaning on the screen or output the meaning by voice through a speaker.

In addition, when the user's eye-gaze processing pattern based on the eye-tracking data indicates gazing at a specific image (e.g., a red sports car) on the screen and a voice input signal is "what is this?", the display apparatus 108 may search for the image being gazed at by the user and output a result showing "the red sports car is the Tesla's 2017 model" on the screen or output the result by voice.

The display apparatus 108 may be operated in conjunction with an artificial intelligence (AI) engine when searching for the meaning of a word or the meaning of an image. That is, in the case in which the user control command based on the voice input signal is for searching for the meaning of an object, such as searching for the meaning of a word or the meaning of an image, the display apparatus 108 may drive the linked AI engine to search for the meaning of the object. In this case, the display apparatus 108 may drive the AI engine according to whether the auxiliary input signal has been received. For example, when the eye-tracking data, the voice input signal, and the auxiliary input signal are all received within a predetermined time delay, the display apparatus 108 may drive the AI engine according to the user control command for searching for the meaning of the object.

In other words, in addition to the eye-tracking data and the voice input signal, the auxiliary input signal is used as a separate input signal to activate the AI engine so that the display apparatus 108 is allowed to operate by distinctly distinguishing between the user's general voice and a voice for input control.

In another example, when the user's eye-gaze processing pattern based on eye-tracking data indicates the user's gaze at a logon page of a website and a voice input signal is "log in to the website", the display apparatus 108 may detect an ID and a password of the corresponding website and perform login process by entering the ID and password of the corresponding website.

In addition, when the user's eye-gaze processing pattern based on eye-tracking data indicates the user's gaze at an account transfer button for Internet banking and a voice input signal is "transfer 100,000 won to my wife", the display apparatus 108 may perform an operation of transferring 100,000 won from the user's account to an account of the user's wife.

Also, the display apparatus 108 may check the user's eye-gaze processing pattern based on the received eye-tracking data, extract the user control command by analyzing the voice input signal received from the voice input apparatus 106, and perform input control on the basis of the eye-gaze processing pattern and the user control command.

For example, when the user's eye-gaze processing pattern based on eye-tracking data indicates a direction of gaze movement from the top of the screen to the bottom and a voice input signal is "display a control menu on the screen", the display apparatus 108 may display a control menu of currently performed content (e.g., a music player or the like) on the screen by scrolling in the direction of gaze movement. In this case, the display apparatus 108 may analyze the voice input signal to extract that the user control command is a screen display of the control menu.

Input Control in Accordance with a Combination of Eye-Tracking Data, an Auxiliary Input Signal, and a Voice Input Signal The display apparatus 108 may control input to the display apparatus 108 on the basis of eye-tracking data received from the eye-tracking apparatus 102, an auxiliary input signal received from the auxiliary input apparatus 104, and a voice input signal received from the voice input apparatus 106. In an exemplary embodiment, the auxiliary input signal may serve to activate a function of analyzing the voice input signal in the display apparatus 108. That is, the auxiliary input signal may enable the display apparatus 108 to clearly recognize that the user intends to perform predetermined input control on the basis of the eye-tracking data and the voice input signal. In this case, in the embodiments of the input control in accordance with the above-described combination of the eye-tracking data and the voice input signal, the display apparatus 108 may analyze the voice input signal to perform input control corresponding to the voice input signal only when the auxiliary input signal is additionally received.

However, the embodiments are not limited thereto and the display apparatus 108 may perform input control in accordance with a combination of an eye-gaze processing pattern based on the eye-tracking data, an auxiliary input signal pattern based on the auxiliary input signal, and a user control command based on the voice input signal. For example, when the eye-gaze processing pattern indicates the gaze movement from the left of the screen to the right, the user control command based on the voice input signal is an "increase of playback speed" of content, and the auxiliary input signal indicates an auxiliary input duration of 3 seconds, the display apparatus 108 may perform input control for fast-forwarding the displayed content on the screen for 3 seconds.

Figure 4:
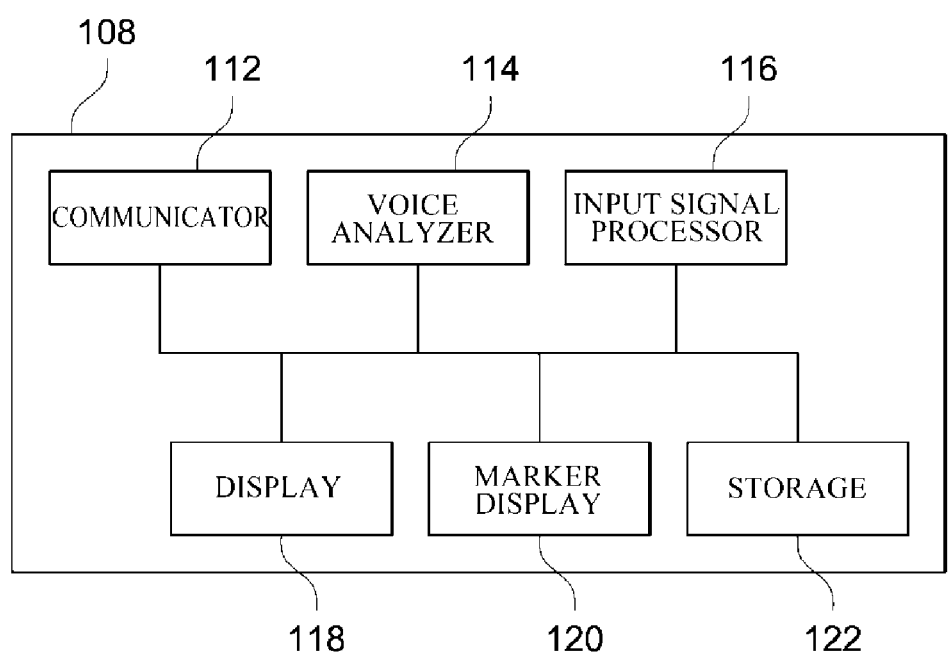
FIG. 4 is a diagram illustrating an example in which a stored operation that matches input control is performed in the process of content input control.

FIG. 4 is a block diagram illustrating a display apparatus according to one embodiment of the present disclosure. Referring to FIG. 4, the display apparatus 108 may include a communicator 112, a voice analyzer 114, an input signal processor 116, a display 118, a marker display 120, and a storage 122.

The communicator 112 may perform wireless communication with each of an eye-tracking apparatus 102, an auxiliary input apparatus 104, and a voice input apparatus 106 over a short range wireless network (e.g., Bluetooth, Wi-Fi, or the like). However, the embodiment is not limited thereto, and the communicator 112 may perform wire communication through cables or a communication bus. The communicator 112 may receive eye-tracking data from the eye-tracking apparatus 102. In addition, the communication 112 may receive an auxiliary input signal from the auxiliary input apparatus 104. Also, the communicator 112 may receive a voice input signal from the voice input apparatus 106.

The voice analyzer 114 may extract a user control command by analyzing the received voice input signal. Specifically, the voice analyzer 114 may convert the received voice input signal into a corresponding character string and then extract the user control command by analyzing the converted character string.

The input signal processor 116 may perform predetermined input control of the display apparatus 108 according to a combination of at least two of the following which are received from the communicator 112: the eye-tracking data; the auxiliary input signal; and the voice input signal. For example, the input signal processor 116 may perform input control corresponding to a combination of a user's eye-gaze processing pattern based on the eye-tracking data and an auxiliary input signal pattern based on the auxiliary input signal.

Also, the input signal processor 116 may detect a target associated with input control on a screen of the display apparatus 108 on the basis of the eye-tracking data and perform input control for the detected target associated with input control according to the user control command extracted based on the voice input signal. When the corresponding input control is for performing a search operation, the input signal processor 116 may perform a search operation by driving an AI engine associated with the display apparatus 108 and receive a search result from the AI engine.

In addition, the input signal processor 116 may perform input control on the basis of the user's eye-gaze processing pattern based on the eye-tracking data and the user control command based on the voice input signal. When there is the auxiliary input signal from the auxiliary input apparatus 104 (or there is a predetermined auxiliary input signal pattern based on the auxiliary input signal), the input signal processor 116 may perform an analysis operation for extracting the user control command from the voice input signal.

The display 118 may display one or more pieces of content (or interfaces and the like) on the screen using an image display means. In this case, the image display means may include an electronic display for transmitting visual information, such as LCD, OLED, cathode ray tube (CRT), a plasma display, and the like.

The marker display 120 may display a current gaze position of the user on the screen of the display 118 (hereinafter referred to simply as "on the screen"). For example, the marker display 120 may display a marker in the form of an arrow, a finger, or the like on the screen. In this case, a position of the pertinent marker may correspond to the eye-tracking data received from the eye-tracking apparatus 102.

The marker display 120 may not always display the current gaze position on the screen but may be configured to display the current gaze position of the user on the screen only when the user gazes at a specific position for a predetermined length of time. For example, when the user gazes at a specific position for more than a predetermined period of time (e.g., 0.5 seconds), the marker display 120 may flash the position gazed at by the user on the screen or change the brightness or color of the corresponding position, thereby allowing the user to know where he/she is gazing.

Meanwhile, in one embodiment, when it is determined, based on the eye-tracking data received from the eye-tracking apparatus 102, that the user moves his/her gaze in a specific direction, the marker display 120 may display a marker on the screen to indicate that the gaze has moved in the specific direction. Specifically, when an auxiliary input signal is not received from the auxiliary input device 104 (or a voice input signal is not received) within a predetermined period of time (e.g., 2 seconds) after the eye-tracking data is received from the eye-tracking apparatus 102, the marker display 120 may move and display the marker on the screen along the direction of gaze movement in accordance with the received eye-tracking data. In this case, the marker display control on the screen is easily performed without a separate interface.

A variety of information used in the display apparatus 108 may be stored in the storage 122. Each of input control in accordance with a combination of the eye-tracking data and the auxiliary input signal, input control in accordance with a combination of the eye-tracking data and the voice input signal, and input control in accordance with a combination of the eye-tracking data, the auxiliary input signal, and the voice input signal may be stored in the storage 122. Here, representative examples of information stored in the storage 122 are described above, but the embodiment is not limited thereto. It will be understood that all information that can be stored in the display apparatus 108 can be stored in the storage 120.

Figure 5:
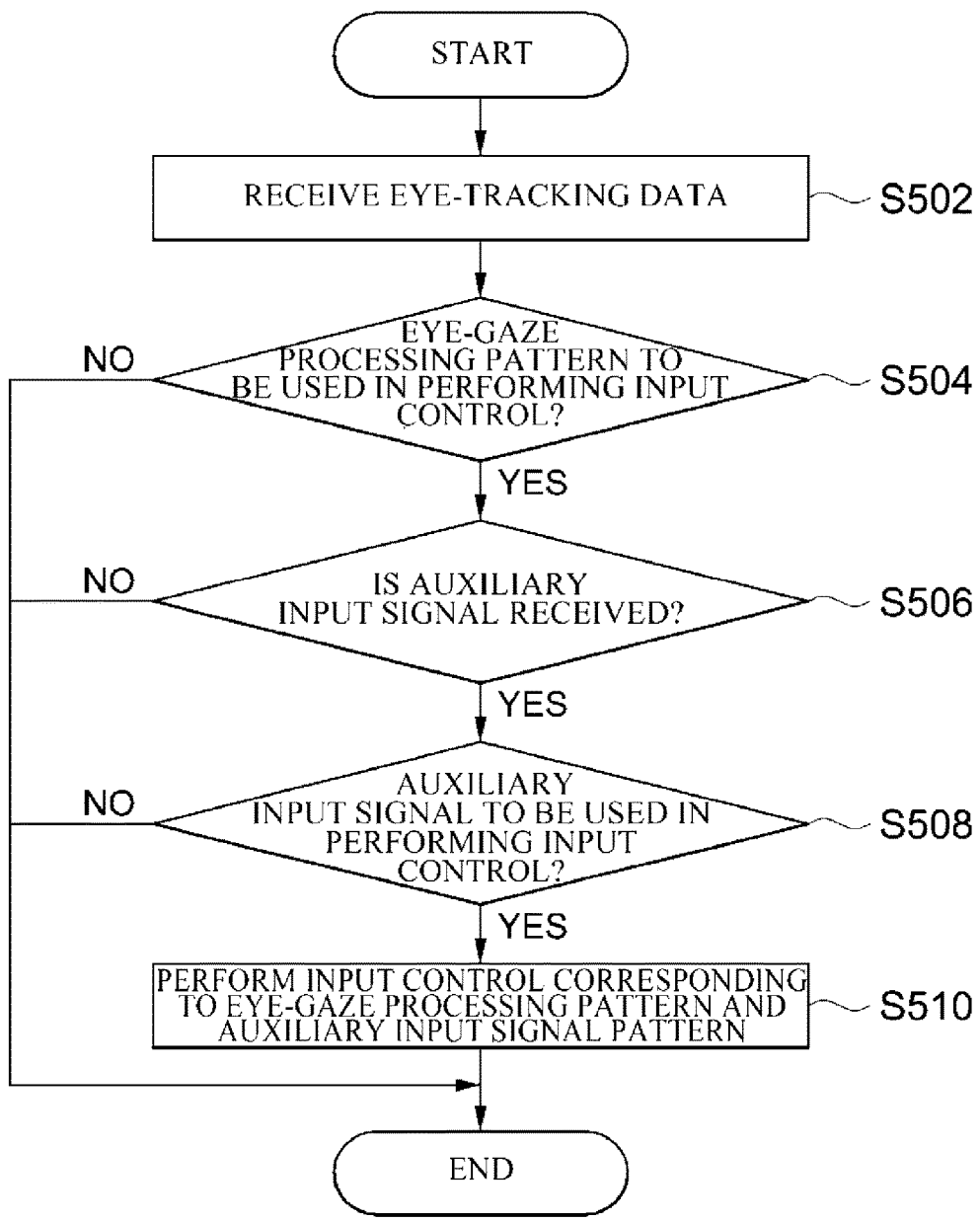
FIG. 5 is a flowchart illustrating a method of processing an input signal according to one embodiment of the present disclosure.

FIG. 5 is a flowchart illustrating a method of processing an input signal according to one embodiment of the present disclosure. Although in the drawing the method is described as being divided into a plurality of operations, at least some of the operations may be performed in different order or may be combined into fewer operations or further divided into more operations. In addition, some of the operations may be omitted, or one or more extra operations, which are not illustrated, may be added to the flowchart and be performed.

Referring to FIG. 5, a display apparatus 108 receives eye-tracking data from an eye-tracking apparatus 102 (S502). Specifically, the display apparatus 108 may receive the eye-tracking data including a current gaze position of a user, a direction of user's gaze movement, whether or not the user is gazing at a predetermined direction, and the like from the eye-tracking apparatus 102.

Then, the display apparatus 108 checks whether the received eye-tracking data is an eye-gaze processing pattern to be used in performing input control (S504). Specifically, the display apparatus 108 may check whether an eye-tracking pattern, which is extracted from the received eye-tracking data, is an eye-gaze processing pattern used in performing pre-stored input control.

When it is determined in operation S504 that the eye-gaze processing pattern extracted from the received eye-tracking data is the eye-gaze processing pattern to be used in performing the pre-stored input control, the display apparatus 108 checks whether an auxiliary input signal is received from an auxiliary input apparatus 104 (S506). Specifically, the display apparatus 108 may check whether the auxiliary input signal is input from the auxiliary input apparatus 104 within a predetermined period of time (e.g., 5 seconds) from the moment of receiving the eye-tracking data from the eye-tracking apparatus 102. When the auxiliary input signal is not received from the auxiliary input device 104, the display apparatus 108 may move or display a marker (e.g., a cursor or the like) on a screen of a display.

When it is determined in operation S506 that the auxiliary input signal is received from the auxiliary input apparatus 104, the display apparatus 108 checks whether the received auxiliary input signal is an auxiliary input signal pattern to be used in performing pre-stored input control (S508). Specifically, the display apparatus 108 may check whether the auxiliary input signal pattern extracted from the received auxiliary input signal is an auxiliary input signal pattern to be used in performing pre-stored input control.

When it is determined in operation S508 that the auxiliary input signal pattern extracted from the auxiliary input signal is the auxiliary input signal pattern to be used in performing the pre-stored input control, the display apparatus 108 performs input control corresponding to the eye-gaze processing pattern and an auxiliary eye-gaze processing pattern (S510). Specifically, the display apparatus 108 may check content (or interface or the like) currently displayed on the display apparatus 108 and perform input control on the content currently displayed on the screen on the basis of the checked eye-gaze processing pattern and the auxiliary input signal pattern.

Figure 6:
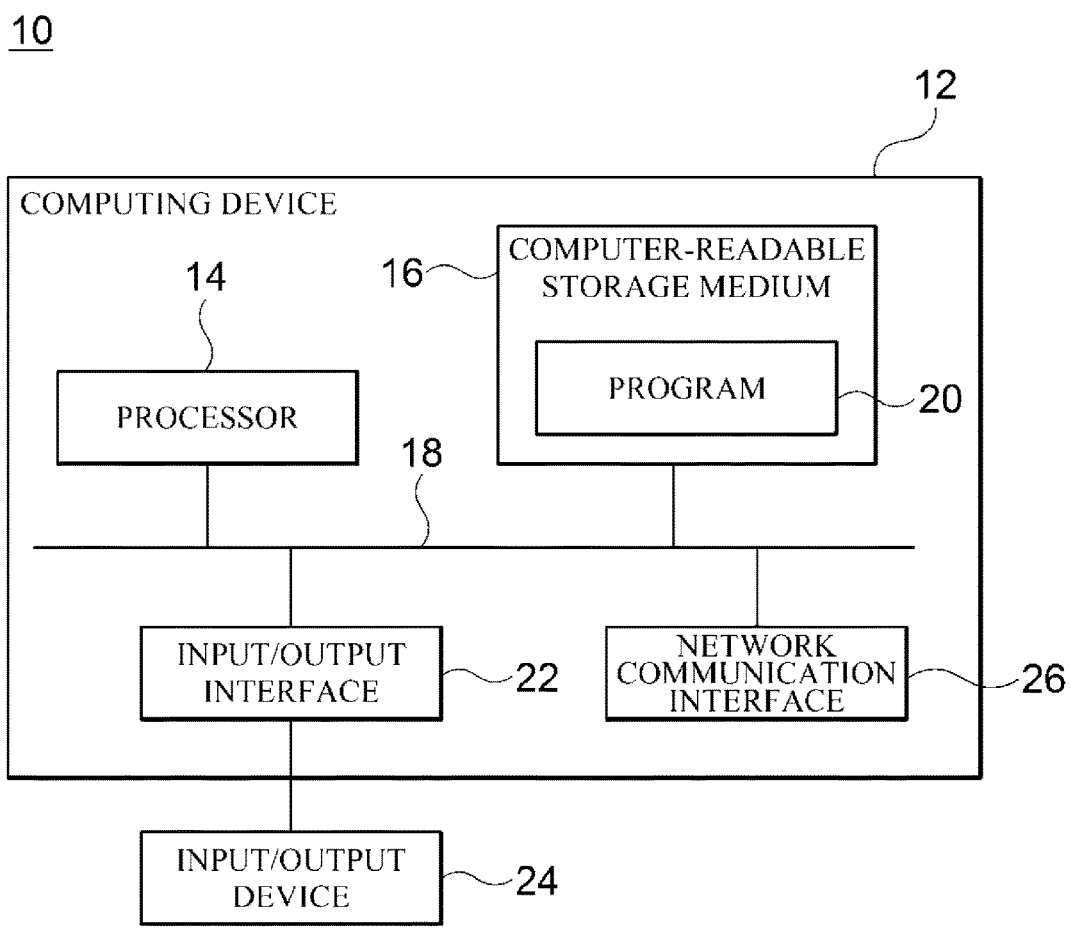
FIG. 6 is a block diagram illustrating an example of a computing environment including a computing device suitable to be used in exemplary embodiments of the present disclosure.

FIG. 6 is a block diagram illustrating an example of a computing environment including a computing device suitable to be used in exemplary embodiments of the present disclosure. In the illustrated embodiment, each of the components may have functions and capabilities different from those described hereinafter and additional components may be included in addition to the components described herein.

The illustrated computing environment 10 includes a computing device. In one embodiment, the computing device 12 may be an apparatus (e.g., a display apparatus 108) for displaying content on a screen. Also, the computing device 12 may be an apparatus (e.g., an eye-tracking apparatus 102) for tracking the gaze of a user. In addition, the computing device 12 may be an apparatus (e.g., an auxiliary input apparatus 104) for checking an auxiliary input of the user.

The computing device 12 may include at least one processor 14, a computer-readable storage medium 16, and a communication bus 18. The processor 14 may cause the computing device 12 to operate according to the aforementioned exemplary embodiment. For example, the processor 14 may execute one or more programs stored in the computer-readable storage medium 16. The one or more programs may include one or more computer executable commands, and the computer executable commands may be configured to, when executed by the processor 14, cause the computing device 12 to perform operations according to the illustrative embodiment.

The computer-readable storage medium 16 is configured to store computer executable commands and program codes, program data and/or information in other suitable forms. The programs stored in the computer readable storage medium 16 may include a set of commands executable by the processor 14. In one embodiment, the computer-readable storage medium 16 may be a memory (volatile memory, such as random access memory (RAM), non-volatile memory, or a combination thereof) one or more magnetic disk storage devices, optical disk storage devices, flash memory devices, storage media in other forms capable of being accessed by the computing device 12 and storing desired information, or a combination thereof.

The communication bus 18 connects various other components of the computing device 12 including the processor 14 and the computer readable storage medium 16.

The computing device 12 may include one or more input/output interfaces 22 for one or more input/output devices 24 and one or more network communication interfaces 26. The input/output interface 22 and the network communication interface 26 are connected to the communication bus 18. The input/output device 24 may be connected to other components of the computing device 12 through the input/output interface 22. The illustrative input/output device 24 may be a pointing device (a mouse, a track pad, or the like), a keyboard, a touch input device (a touch pad, a touch screen, or the like), an input device, such as a voice or sound input device, various types of sensor devices, and/or a photographing device, and/or an output device, such as a display device, a printer, a speaker, and/or a network card. The illustrative input/output device 24 which is one component constituting the computing device 12 may be included inside the computing device 12 or may be configured as a separate device from the computing device 12 and connected to the computing device 12.

According to the embodiments of the present disclosure, input control of a display apparatus is performed through a combination of at least two of the following factors: user's eye-tracking data; an auxiliary input signal; and a voice input signal, thereby allowing the user to accurately control an input to the display apparatus.

Also, according to the embodiments of the present disclosure, a menu is displayed on the screen corresponding to a combination of at least two of the following factors: user's eye-tracking data; an auxiliary input signal; and a voice input signal, so that the user can easily check the menu on the content and thereby user convenience can be increased.

In addition, according to the embodiments of the present disclosure, when content, such as virtual reality, augmented reality, and game, is displayed on the entire screen of the display apparatus, it is possible to easily provide an interface for controlling the content through a combination of at least two of the following factors: the user's eye-tracking data, an auxiliary input signal, and a voice input signal.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An input processing system comprising:
an eye-tracking apparatus configured to generate eye-tracking data by tracking a gaze of a user and transmit the generated eye-tracking data;
a user input apparatus configured to generate a user input signal according to an input of the user and transmit the generated user input signal; and
a display apparatus configured to receive the eye-tracking data and the user input signal, perform input control on the basis of the eye-tracking data and the user input signal, and cancel the performed input control when eye-tracking data is received from the eye-tracking apparatus within a predetermined period of time after performing the input control and the received eye-tracking data is associated with the input control,
wherein the user input apparatus comprises a first user input apparatus configured to generate a voice input signal by receiving audio from the user and transmit the generated voice input signal, the display apparatus detects, on a screen, a target associated with input control on the basis of the eye-tracking data, extract a user control command by analyzing the voice input signal, and perform input control for the detected target associated with input control according to the user control command, and
wherein when an object gazed at by the user on the screen is a word or image on the basis of the eye-tracking data and the user control command is for searching for meaning of the object, the display apparatus drives an artificial intelligence (AI) engine associated with the display apparatus to perform a search for meaning of the object.

2. The input processing system of claim 1, further comprising a second user input apparatus configured to generate an auxiliary input signal according to an input of the user and transmit the generated auxiliary input signal,
wherein the display apparatus activates a function for analyzing the voice input signal according to whether the auxiliary input signal is received.

3. The input processing system of claim 1, further comprising a second user input apparatus configured to generate an auxiliary input signal according to an input of the user and transmit the generated auxiliary input signal,
wherein when all of the eye-tracking data, the voice input signal, and the auxiliary input signal are received within a predetermined time delay, the display apparatus drives an AI engine associated with the display apparatus according to the user control command.

4. The input processing system of claim 1, wherein the user input signal is generated by recognizing a gesture of the user in the user input apparatus and the display apparatus performs predetermined input control corresponding to a combination of an eye-gaze processing pattern based on the eye-tracking data and the gesture of the user.

5. The input processing system of claim 1, wherein when the user's gaze based on the eye-tracking data is located at a specific position on the screen for a first period of time, the display apparatus displays a marker at a position corresponding to the user's gaze; and
in a case in which it is determined, based on the eye-tracking information, that the user's gaze moves, the display apparatus moves the marker on the screen along a direction in which the user's gaze moves, when a voice input signal is not received within a second period of time, which is set to be longer than a first period of time.

6. The input processing system of claim 1, wherein the eye-tracking data enabling the input control to be performed is a direction of gaze movement; and
the display apparatus cancels the performed input control when eye-tracking data including gaze movement in a direction opposite to the direction of gaze movement is received from the eye-tracking apparatus within the predetermined period of time after performing the input control.

7. The input processing system of claim 1, wherein the eye-tracking data enabling the input control to be performed is a gaze at a specific position on the screen of the display apparatus, and
the display apparatus cancels the performed input control when eye-tracking data indicating re-gazing at the same specific position on the screen is received from the eye-tracking apparatus within the predetermined period of time after performing the input control.

8. A display apparatus comprising:
one or more processors;
a memory; and
one or more programs,
wherein the one or more programs are stored in the memory and are configured to be executed by the one or more processors and the one or more programs include:
a command for receiving eye-tracking data generated by tracking a gaze of a user from an eye-tracking apparatus;
a command for receiving a user input signal generated in accordance with an input of the user from a user input apparatus;
a command for performing input control on the basis of the eye-tracking data and the user input signal;
a command for checking whether eye-tracking data is received from the eye-tracking apparatus within a predetermined period of time after performing the input control; and
a command for cancelling the performed input control when the eye-tracking data is received and the received eye-tracking data is associated with the input control,
wherein:
the user input signal includes a voice input signal generated by receiving audio from the user; and
the command of the one or more programs for performing the input control further includes:
a command for detecting, on the screen, a target associated with input control on the basis of the eye-tracking data;
a command for extracting a user control command by analyzing the voice input signal; and
a command for performing input control for the detected target associated with input control according to the user control command, and
wherein the command of the one or more programs for performing the input control includes
a command for checking, based on the eye-tracking data, whether an object being gazed at by the user on the screen is a word or image; and
a command for performing a search for meaning of the object by driving an artificial intelligence (AI) engine associated with the display apparatus when the user control command is for searching for meaning of the object.

9. The display apparatus of claim 8, wherein:
the user input signal further include an auxiliary input signal generated in accordance with an input of the user; and
the one or more programs further include a command for activating a function for analyzing the voice input signal according to whether the auxiliary input signal is received.

10. The display apparatus of claim 8, wherein:
the user input signal further includes an auxiliary input signal generated in accordance with an input of the user and
the command of the one or more programs for performing the input control includes a command for driving an AI engine associated with the display apparatus according to the user control command when all of the eye-tracking data, the voice input signal, and the auxiliary input signal are received within a predetermined time delay.

11. The display apparatus of claim 8, wherein:
the user input signal is generated by recognizing a gesture of the user in the user input apparatus; and
the command of the one or more programs for performing the input control is for performing predetermined input control corresponding to a combination of an eye-gaze processing pattern based on the eye-tracking data and the gesture of the user.

12. The display apparatus of claim 8, wherein the one or more programs further include:
a command for displaying a marker at a position corresponding to the user's gaze when the user's gaze based on the eye-tracking data is located at a specific position on the screen for a first period of time; and
a command for moving the marker on the screen along a direction in which the user's gaze moves, when it is determined that the user's gaze moves on the basis of the eye-tracking data and when a voice input signal is not received within a second period of time, which is set to be longer than a first period of time.

13. A input processing method which is performed by a computing device comprising one or more processors and a memory in which one or more programs to be executed by the one or more processors are stored, the input processing method comprising:
receiving eye-tracking data generated by tracking a gaze of a user from an eye-tracking apparatus;
receiving a user input signal generated in accordance with an input of the user from a user input apparatus;
performing input control on the basis of the eye-tracking data and the user input signal;
checking whether eye-tracking data is received from the eye-tracking apparatus within a predetermined period of time after performing the input control; and
cancelling the performed input control when the eye-tracking data is received and the received eye-tracking data is associated with the input control,
wherein:
the user input signal includes a voice input signal generated by receiving audio from the user; and
the performing the input control includes:
detecting, on the screen, a target associated with input control on the basis of the eye-tracking data;
extracting a user control command by analyzing the voice input signal; and
performing input control for the detected target associated with input control according to the user control command, and
wherein the performing the input control further includes
checking, based on the eye-tracking data, whether an object being gazed at by the user on the screen is a word or image; and
performing a search for meaning of the object by driving an artificial intelligence (AI) engine associated with the display apparatus when the user control command is for searching for meaning of the object.

* * * * *